US009596336B2

(12) United States Patent
Takagi

(10) Patent No.: US 9,596,336 B2
(45) Date of Patent: Mar. 14, 2017

(54) COMMUNICATION APPARATUS CONNECTABLE TO EXTERNAL APPARATUS, AND CONTROL METHOD THEREOF

(71) Applicant: CANON KABUSHIKI KAISHA, Tokyo (JP)

(72) Inventor: Toshiyuki Takagi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/837,646

(22) Filed: Aug. 27, 2015

(65) Prior Publication Data

US 2016/0072941 A1 Mar. 10, 2016

(30) Foreign Application Priority Data

Sep. 8, 2014 (JP) .................................. 2014-182504

(51) Int. Cl.
*H04B 1/38* (2015.01)
*H04M 1/725* (2006.01)

(52) U.S. Cl.
CPC ...... *H04M 1/72527* (2013.01); *H04M 1/7253* (2013.01)

(58) Field of Classification Search
CPC ........... H04M 1/72527; H04M 1/7253; H04W 72/048; H04W 88/08
USPC ........ 455/41.1, 41.2, 557, 456.2, 512, 67.11, 455/552.1, 556.1, 558, 127.4; 709/228; 358/1.15
See application file for complete search history.

(56) References Cited

U.S. PATENT DOCUMENTS

| | | | |
|---|---|---|---|
| 6,005,535 A | 12/1999 | Takagi et al. | 345/2 |
| 6,535,932 B1 | 3/2003 | Endoh et al. | 710/7 |
| 6,717,689 B1 | 4/2004 | Endo et al. | 358/1.15 |
| 7,907,296 B2 | 3/2011 | Endo et al. | 358/1.15 |
| 9,444,750 B2 * | 9/2016 | Kimura | H04L 47/25 |
| 2002/0037711 A1* | 3/2002 | Mizutani | H04M 1/7253 455/414.1 |
| 2006/0229014 A1* | 10/2006 | Harada | H04M 1/7253 455/41.2 |

(Continued)

FOREIGN PATENT DOCUMENTS

| | | | | |
|---|---|---|---|---|
| JP | 2013-157736 | | 8/2013 | |
| JP | WO 2014/017071 A1 * | | 1/2014 | H04M 1/00 |

*Primary Examiner* — Tan H Trinh
(74) *Attorney, Agent, or Firm* — Fitzpatrick, Cella, Harper & Scinto

(57) ABSTRACT

A communication apparatus connectable to an external apparatus via first communication unit and second communication unit different from the first communication unit, comprises: an obtaining unit configured to obtain device information about the external apparatus from the external apparatus via the first communication unit; a connection unit configured to perform connection processing to the external apparatus via the second communication unit based on the device information; and a control unit configured to determine an internal state of the communication apparatus and to control a connection to the external apparatus via the second communication unit in accordance with a determination result, wherein the control unit changes a determination timing in accordance with a type of the external apparatus determined based on the device information obtained via the first communication unit.

21 Claims, 12 Drawing Sheets

(56) References Cited

U.S. PATENT DOCUMENTS

| | | | |
|---|---|---|---|
| 2010/0153594 A1* | 6/2010 | Nakayama | G06F 1/266 710/63 |
| 2010/0283582 A1* | 11/2010 | Fujita | H04N 1/00236 340/7.37 |
| 2012/0071099 A1* | 3/2012 | Okinoi | G06K 7/00 455/41.2 |
| 2012/0162195 A1* | 6/2012 | Yamada | H04N 13/0275 345/419 |
| 2013/0229685 A1* | 9/2013 | Naruse | G06F 3/1207 358/1.15 |
| 2013/0235217 A1* | 9/2013 | Sekiguchi | H04N 1/00347 348/207.1 |
| 2014/0187163 A1* | 7/2014 | Fujita | H04W 4/008 455/41.2 |
| 2014/0201380 A1* | 7/2014 | Iko | H04L 67/141 709/228 |
| 2014/0268222 A1* | 9/2014 | Inoue | G06F 3/1221 358/1.15 |
| 2014/0342665 A1* | 11/2014 | Amano | H04W 52/0229 455/41.1 |
| 2015/0133194 A1* | 5/2015 | Shintani | H04W 40/02 455/557 |
| 2015/0143357 A1* | 5/2015 | Shin | H04L 41/24 717/170 |
| 2015/0172438 A1* | 6/2015 | Yang | H04M 1/72533 455/419 |
| 2015/0189489 A1* | 7/2015 | Banno | H04W 4/00 370/328 |
| 2015/0245186 A1* | 8/2015 | Park | H04W 4/16 455/417 |
| 2015/0245298 A1* | 8/2015 | Takahashi | H04W 52/0254 455/574 |
| 2015/0341968 A1* | 11/2015 | Takagi | H04W 76/021 370/329 |
| 2015/0350297 A1* | 12/2015 | Yang | H04L 67/025 715/740 |
| 2015/0365899 A1* | 12/2015 | Hayashi | H04W 52/0235 455/41.1 |
| 2015/0378331 A1* | 12/2015 | Hayashi | H04L 12/6418 700/19 |
| 2015/0381798 A1* | 12/2015 | Yoon | H04M 1/72577 455/411 |
| 2016/0006864 A1* | 1/2016 | Park | G06F 17/30873 715/835 |
| 2016/0088423 A1* | 3/2016 | Takagi | H04W 4/008 455/552.1 |
| 2016/0143079 A1* | 5/2016 | Yoon | H04W 76/02 455/41.1 |

* cited by examiner

FIG. 2

| | | CONDITION FOR DISABLING WIRELESS LAN CONNECTION | CONDITION FOR ENABLING WIRELESS LAN CONNECTION |
|---|---|---|---|
| CONDITION 1 | POWER SUPPLY STATE | POWER SWITCH IS TURNED OFF | POWER SWITCH IS TURNED ON |
| CONDITION 2 | WIRELESS LAN FUNCTION | WIRELESS LAN FUNCTION IS DISABLED | WIRELESS LAN FUNCTION IS ENABLED |
| CONDITION 3 | WIRELESS LAN COMMUNICATION IN PROGRESS | WIRELESS LAN COMMUNICATION IS IN PROGRESS | WIRELESS LAN COMMUNICATION IS TERMINATED |
| CONDITION 4 | PRESENCE/ABSENCE OF MEMORY CARD | MEMORY CARD IS NOT INSERTED | MEMORY CARD IS INSERTED |
| CONDITION 5 | SHOOTING STATE | RELEASE SWITCH IS PRESSED HALFWAY | HALFWAY PRESSING STATE OF RELEASE SWITCH IS CANCELED |
| CONDITION 6 | MOVING IMAGE SHOOTING STATE | MOVING IMAGE SHOOTING SWITCH IS TURNED ON | MOVING IMAGE SHOOTING SWITCH IS TURNED OFF |

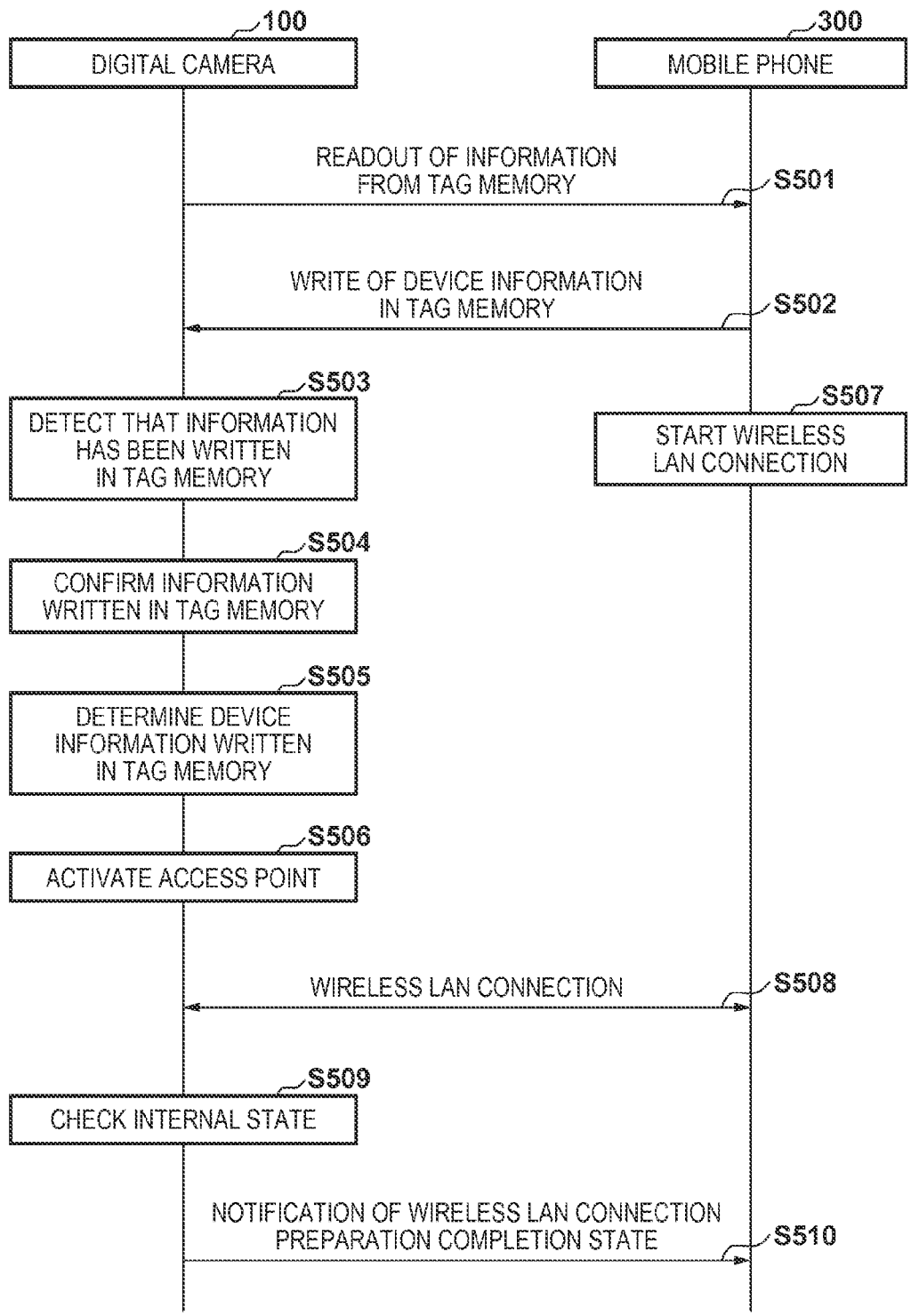

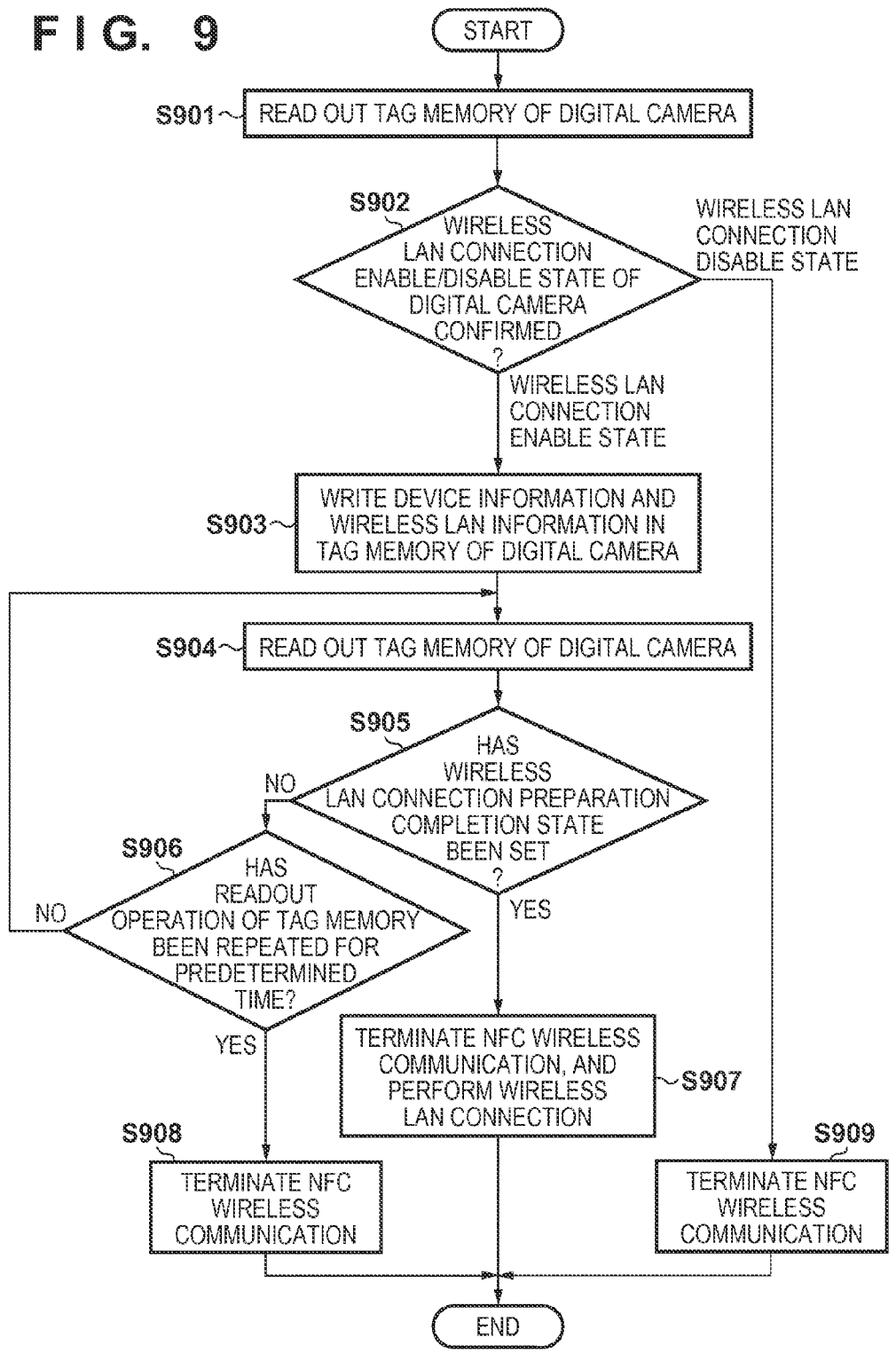

COMMUNICATION APPARATUS CONNECTABLE TO EXTERNAL APPARATUS, AND CONTROL METHOD THEREOF

BACKGROUND OF THE INVENTION

Field of the Invention

The present invention relates to a communication apparatus connectable to an external apparatus, and a control method thereof.

Description of the Related Art

There is known a digital camera which can be connected to a mobile phone via wireless communication and exchange image data with the mobile phone. There is also known a technique in which when establishing a connection by, for example, a wireless LAN (Local Area Network), communication parameters necessary for the connection are transmitted/received in advance by another wireless communication method, thereby automating some of user operations necessary for the connection by the wireless LAN. Japanese Patent Laid-Open No. 2013-157736 discloses a so-called handover technique of transmitting/receiving communication parameters necessary for communication by a wireless LAN by performing NFC (Near Field Communication) communication, establishing a wireless LAN connection, and transiting to the connection.

A digital camera may be connected to a data server (file server) used for an online storage service or the like by a communication unit such as a wireless LAN, and then data such as images in the digital camera may be transferred to the data server and backed up in it. As described in Japanese Patent Laid-Open No. 2013-157736, using the handover technique can automate some of user operations for establishing communication between the digital camera and the data server, thereby facilitating data transfer.

However, when data are transferred to a stationary external apparatus like a data server, the user performs no operation for the digital camera or data server during wireless LAN communication after a handover in many cases. Consequently, when the wireless LAN connection is interrupted or disconnected due to an abnormality such as a shortage of the remaining capacity of the battery of the digital camera, even if a notification of the interruption caused by some abnormality is sent, the user may not notice it. For example, if the user starts a backup operation, leaves there, returns after a given time, and then notices an interruption caused by an abnormality for the first time, the time until now is in vain. Therefore, it is desirable to notify, when performing near field wireless communication, the user of whether it is possible to perform data transfer (that is, data communication) after a handover. On the other hand, in data transfer with a mobile phone which is held by the user to perform an operation, the user can grasp the occurrence of an abnormality at any time. In consideration of the operability, it is desirable to complete handover processing within a time as short as possible.

SUMMARY OF THE INVENTION

The present invention has been made in consideration of the aforementioned problems, and realizes a technique capable of appropriately controlling notification processing to the user at the time of a handover in accordance with a connection partner device.

In order to solve the aforementioned problems, the present invention provides a communication apparatus connectable to an external apparatus via first communication unit and second communication unit different from the first communication unit, comprising: an obtaining unit configured to obtain device information about the external apparatus from the external apparatus via the first communication unit; a connection unit configured to perform connection processing to the external apparatus via the second communication unit based on the device information; and a control unit configured to determine an internal state of the communication apparatus and to control a connection to the external apparatus via the second communication unit in accordance with a determination result, wherein the control unit changes a determination timing in accordance with a type of the external apparatus determined based on the device information obtained via the first communication unit.

In order to solve the aforementioned problems, the present invention provides a communication apparatus connectable to an external apparatus via first communication unit and second communication unit different from the first communication unit, comprising: an obtaining unit configured to obtain device information about the external apparatus from the external apparatus via the first communication unit; and a control unit configured to control connection processing to the external apparatus via the second communication unit based on the device information, wherein the control unit determines an internal state of the communication apparatus, and wherein the control unit changes a determination level of the internal state of the communication apparatus in accordance with a type of the external apparatus from which the device information has been obtained via the first communication unit.

In order to solve the aforementioned problems, the present invention provides a control method of a communication apparatus connectable to an external apparatus via first communication unit and second communication unit different from the first communication unit, having: an obtaining step of obtaining device information about the external apparatus from the external apparatus via the first communication unit; and a control step of controlling connection processing to the external apparatus via the second communication unit based on the device information, wherein in the control step, an internal state of the communication apparatus is determined, and wherein in the control step, a determination level of the internal state of the communication apparatus is changed in accordance with a type of the external apparatus from which the device information has been obtained via the first communication unit.

In order to solve the aforementioned problems, the present invention provides a control method of a communication apparatus connectable to an external apparatus via first communication unit and second communication unit different from the first communication unit, having: an obtaining step of obtaining device information about the external apparatus from the external apparatus via the first communication unit; and a control step of controlling connection processing to the external apparatus via the second communication unit based on the device information, wherein in the control step, an internal state of the communication apparatus is determined, and wherein in the control step, a determination level of the internal state of the communication apparatus is changed in accordance with a type of the external apparatus from which the device information has been obtained via the first communication unit.

According to the present invention, it is possible to appropriately control notification processing to the user at the time of a handover in accordance with a connection device.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a table showing conditions for the wireless LAN connection enable/disable state of the digital camera according to the embodiment;

FIG. 5 is a sequence chart showing a connection sequence between the digital camera and the mobile phone;

FIG. 9 is a flowchart illustrating a series of operations of connection processing in the data server according to the first embodiment;

DESCRIPTION OF THE EMBODIMENTS (First Embodiment)

An exemplary embodiment of the present invention will be described in detail below with reference to the accompanying drawings. Note that a case in which the present invention is applied to a digital camera including two wireless communication unit communicably connected to a mobile phone and data server that serve as external apparatuses will be explained as an example of a communication apparatus. The communication apparatus according to the present invention is not limited to a digital camera, and the present invention is applicable to arbitrary electronic devices including such communication unit. The electronic devices may include, for example, a mobile phone, game machine, tablet terminal, personal computer, and watch-type and spectacle-type information terminals.

(Arrangement of Digital Camera 100)

Figure 1:
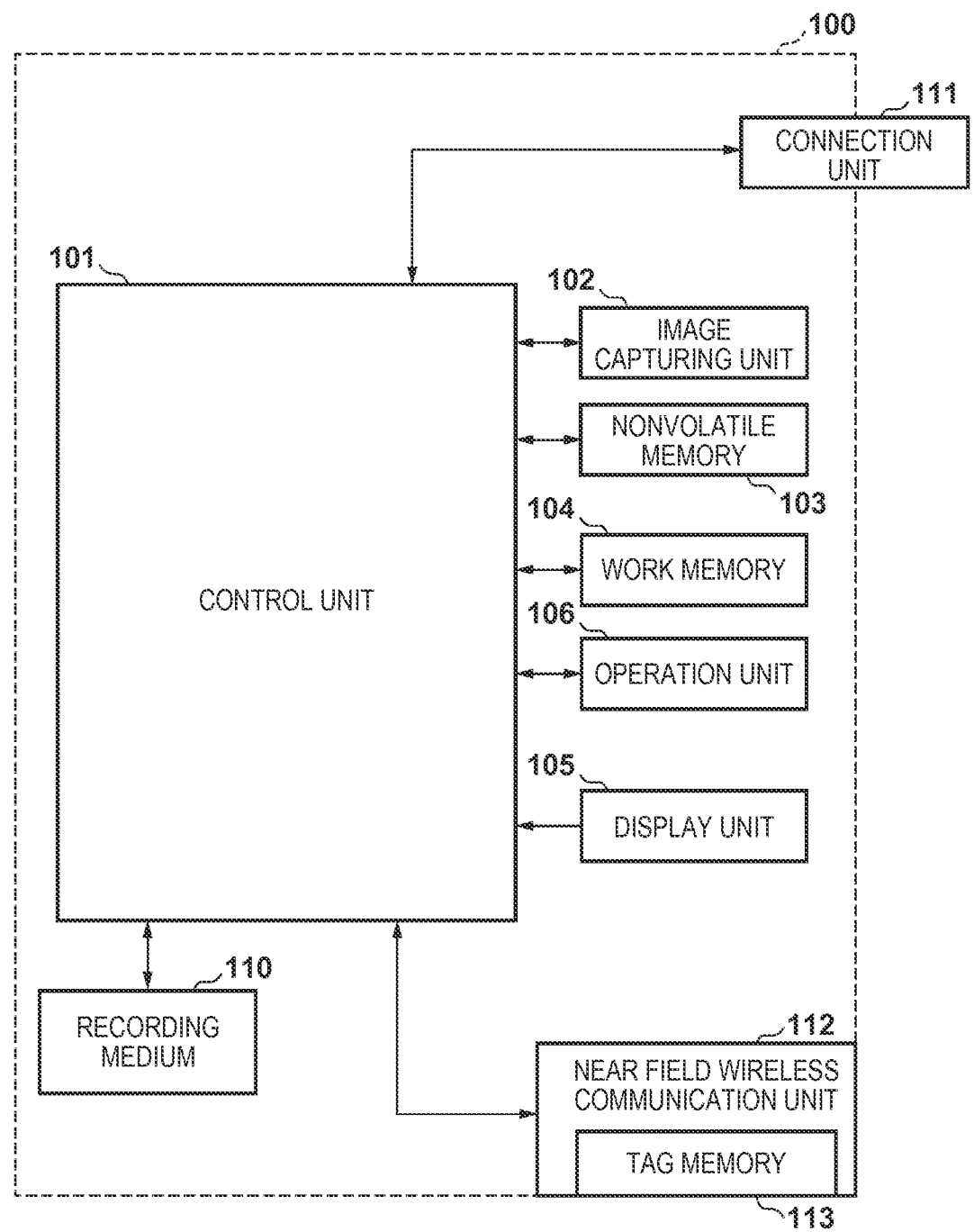
FIG. 1 is a block diagram showing an example of the functional arrangement of a digital camera as an example of a communication apparatus according to an embodiment of the present invention.

FIG. 1 is a block diagram showing an example of the functional arrangement of the digital camera 100 as an example of the communication apparatus according to this embodiment. Note that one or more functional blocks shown in FIG. 1 may be implemented by hardware such as an ASIC or a programmable logic array (PLA) or by causing a programmable processor such as a CPU or MPU to execute software. The functional blocks may be implemented by combining software and hardware. Therefore, in the following description, even when different functional blocks are described as the operation entity, the same hardware can be implemented as the entity.

A control unit 101 is, for example, a CPU or MPU, and controls the overall digital camera 100 by loading programs stored in a nonvolatile memory 103 into a work area of a work memory 104 and executing them. The control unit 101 also performs communication control according to a connection device such as a mobile phone 300 or data server 400 (both will be described later). Note that instead of controlling the overall digital camera 100 by the control unit 101, a plurality of hardware components may control the overall digital camera 100 by sharing processing.

An image capturing unit 102 includes, for example, an optical lens unit, an optical system for controlling the stop, zoom, focus, and the like, and an image sensor for converting light introduced via the optical lens unit into an electrical video signal. A CMOS (Complementary Metal Oxide Semiconductor) or CCD (Charge Coupled Device) is used as an image sensor. Under the control of the control unit 101, the image capturing unit 102 causes the image sensor to convert, into an electrical signal, an object optical image formed by a lens included in the image capturing unit 102, performs processing such as noise reduction processing, and outputs image data. After the captured image data is accumulated in the nonvolatile memory 103, it undergoes predetermined computation by the control unit 101, and is recorded in a recording medium 110.

The nonvolatile memory 103 is an electrically erasable/recordable nonvolatile memory, and temporarily records captured image data and also stores programs to be executed by the control unit 101, and the like. The nonvolatile memory 103 records an OS (Operating System) as basic software executed by the control unit 101, and application software for implementing an application function in cooperation with the OS.

The work memory 104 is used as a buffer memory for temporarily holding image data captured by the image capturing unit 102, an image display memory for a display unit 106, a work area for the control unit 101, and the like.

An operation unit 105 accepts a user instruction to the digital camera 100, and notifies the control unit 101 of it. The operation unit 105 includes, for example, a power button used by the user to instruct ON/OFF of the power of the digital camera 100, a release switch used by the user to instruct shooting, a moving image shooting switch used by the user to instruct moving image shooting, and a playback button used by the user to instruct playback of image data. The operation unit 105 further includes an operation member such as a dedicated connection button used to start communication with an external device via a connection unit 111 (to be described later). A touch panel formed on the display unit 106 (to be described later) is also included in the operation unit 105. Note that the release switch includes SW1 and SW2. When the release switch is pressed halfway, SW1 is turned on. When the control unit 101 is notified of such operation, it starts shooting preparations such as AF (Auto Focus) processing, AE (Auto Exposure) processing, AWB (Auto White Balance) processing, and EF (flash pre-emission) processing. When the release switch is fully pressed, SW2 is turned on. Upon receiving a notification indicating that the operation has been accepted, the control unit 101 controls the respective units to perform shooting.

The display unit 106 displays a live view image in a shooting preparation state, captured image data, characters for an interactive operation, and the like. Note that the display unit 106 need not always be incorporated in the digital camera 100. The digital camera 100 can be connected to the internal or external display unit 106, and need only have at least a display control function of controlling display of the display unit 106.

The recording medium 110 can record image data output from the image capturing unit 102. The image data is recorded in a format complying with, for example, the DCF (Design Rule for Camera File system) standard. The recording medium 110 may be configured to be detachable from the digital camera 100, or may be incorporated in the digital camera 100. That is, the digital camera 100 need only be at least accessible to the recording medium 110.

The connection unit 111 is an interface for connecting an external apparatus. The digital camera 100 according to this embodiment can exchange data with an external apparatus via the connection unit 111. For example, image data generated by the image capturing unit 102 can be transmitted to an external apparatus via the connection unit 111. Note that in this embodiment, the connection unit 111 includes an interface used to perform communication with an external apparatus via a so-called wireless LAN complying with the IEEE802.11 standard. The control unit 101 controls the connection unit 111 to implement wireless communication with an external apparatus. Note that the communication method is not limited to the wireless LAN. For example, wireless communication modules such as an infrared communication module, Bluetooth® communication module, and a wireless communication module such as a wireless USB can be included. Furthermore, a wired connection such as a USB cable, HDMI®, or IEEE1394 may be adopted. The connection unit 111 is an example of the first wireless communication unit.

A near field wireless communication unit 112 includes, for example, an antenna for wireless communication, a modulation/demodulation circuit for processing a wireless signal, and a communication controller. The near field wireless communication unit 112 implements non-contact near field communication complying with the ISO/IEC 18092 standard (so-called NFC (Near Field Communication) by outputting a modulated wireless signal from the antenna, and demodulating a wireless signal received by the antenna. The near field wireless communication unit 112 according to this embodiment is arranged on the side portion of the digital camera 100.

The digital camera is connected to the mobile phone 300 (to be described later) by bringing the near field wireless communication units of the apparatuses closer to each other to start communication. Note that when performing connection using the near field wireless communication units, it is not always necessary to bring the near field wireless communication units into contact with each other. Since the near field wireless communication units can communicate with each other even if they are apart from each other by a given distance, it is only necessary to bring the near field wireless communication units closer to each other within a range where near field wireless communication is possible to connect the apparatuses. In the following description, "bringing the near field wireless communication units closer to each other within the range where near field wireless communication is possible" will be referred to as "bringing the near field wireless communication units closer to each other".

If the near field wireless communication units fall within a range where near field wireless communication is impossible, no communication starts. When the near field wireless communication units 112 of the digital cameras 100 fall within the range where near field wireless communication is possible and the digital cameras 100 are communicably connected to each other, if the near field wireless communication units 112 are separated from each other to the range where near field wireless communication is impossible, the communicable connection is canceled. Note that non-contact near field communication implemented by the near field wireless communication unit 112 is not limited to NFC and another wireless communication may be adopted. For example, non-contact near field communication complying with the ISO/IEC 14443 standard may be adopted as non-contact near field communication implemented by the near field wireless communication unit 112, and the near field wireless communication unit 112 is an example of the second wireless communication unit.

While the control unit 101 can read/write data from/in a tag memory 113, an external device having a reader/writer function complying with NFC can read/write data in the tag memory 113 via near field wireless communication. Note that when performing near field wireless communication with an external device, control is executed by using power generated by electromagnetic induction at the time of receiving a radio wave supplied from the external device. Therefore, even if the digital camera 100 is in a power-off state, an external device can read/write data.

Note that the communication speed of communication implemented by the connection unit 111 is higher than that of communication implemented by the near field wireless communication unit 112 (to be described later), and the communication range of communication implemented by the connection unit 111 is wider than that of communication implemented by the near field wireless communication unit 112. On the other hand, in communication by the near field wireless communication unit 112, since the communicable range is limited, a communication partner can be limited, and processing such as exchange of an encryption key necessary for communication implemented by the connection unit 111 is not required. Therefore, it is possible to establish a connection by simple processing, as compared with a case in which the connection unit 111 is used.

Note that the connection unit 111 of the digital camera 100 according to this embodiment has an AP mode of operating as an access point in an infrastructure mode, and a CL mode of operating as a client in the infrastructure mode. For example, when the control unit 101 operates the connection unit 111 in the CL mode, the digital camera 100 can operate as a CL device in the infrastructure mode. When the digital camera 100 operates as a CL device, it can be connected to a peripheral AP device to join a network formed by the AP device. Alternatively, when the control unit 101 operates the connection unit 111 in the AP mode, the digital camera 100 can operate as an AP device or a simple AP whose function is limited (to be referred to as a simple AP hereinafter). When the digital camera 100 operates as an AP or simple AP, it forms a network by itself. A peripheral apparatus of the digital camera 100 can recognize the digital camera 100 as an AP device, and join the network formed by the digital camera 100.

Note that the digital camera 100 according to this embodiment is a kind of AP but is a simple AP without a gateway function of transferring data received from a CL device to an Internet provider or the like. Therefore, even if the digital camera 100 receives data from another apparatus which joins the network formed by the self apparatus, it cannot transfer the data to a network such as the Internet.

(Determination of Wireless LAN Connection Enable/Disable State by Digital Camera)

Conditions for determining a wireless LAN connection enable/disable state by the digital camera 100 will be described with reference to a table shown in FIG. 2. The wireless LAN connection enable/disable state is information indicating whether connection by a wireless LAN is possible under conditions 1 to 6 of the digital camera 100 to be described below. The control unit 101 writes the wireless LAN connection enable/disable state in the tag memory 113 in accordance with the internal state of the digital camera 100. This is done because the digital camera 100 cannot perform wireless LAN connection depending on the state. The mobile phone 300 can read out, via near field wireless communication, the wireless LAN connection enable/disable state written in the tag memory 113 of the digital camera 100, thereby determining whether the digital camera 100 can perform wireless LAN connection. Note that a wireless LAN connection enable state is a state in which predetermined conditions, for example, conditions for enabling wireless LAN connection with respect to all conditions 1 to 6 are satisfied. If the readout wireless LAN connection enable/disable state indicates the wireless LAN connection enable state, the mobile phone 300 starts a wireless LAN connection to the digital camera 100. If the readout wireless LAN connection enable/disable state indicates a wireless LAN disable state, the mobile phone 300 starts no wireless LAN connection.

As conditions for determining the wireless LAN connection enable/disable state by the digital camera 100, six conditions of conditions 1 to 6 will be exemplified.

Condition 1: Power Supply State

While the power of the digital camera 100 is OFF, it is impossible to perform wireless LAN connection. If the power is turned off by a user operation, the control unit 101 writes the wireless LAN connection disable state in the tag memory 113. On the other hand, if the power is turned on by a user operation, the control unit 101 writes the wireless LAN connection enable state in the tag memory 113.

Condition 2: Use Setting of Wireless LAN Function

In the digital camera 100 according to this embodiment, it is possible to set whether to use the wireless LAN function by a menu operation or the like by the user. If the wireless LAN function of the digital camera 100 is disabled, it is impossible to perform wireless LAN connection. Therefore, if the wireless LAN function is disabled by a user operation, the control unit 101 writes the wireless LAN connection disable state in the tag memory 113. On the other hand, if the wireless LAN function is enabled by a user operation, the control unit 101 writes the wireless LAN connection enable state in the tag memory 113.

Condition 3: Wireless LAN Communication in Progress

If wireless LAN communication with a given device is already in progress, the digital camera 100 according to this embodiment cannot perform wireless LAN connection to another new device. Therefore, if wireless LAN communication with a given device via the connection unit 111 is in progress, the control unit 101 writes the wireless LAN connection disable state in the tag memory 113. On the other hand, when wireless LAN communication with a given device is terminated, the control unit 101 writes the wireless LAN connection enable state in the tag memory 113.

Condition 4: Presence/Absence of Memory Card

If the recording medium 110 of the digital camera 100 is a detachable memory card, and the memory card is not inserted to the digital camera 100, it is impossible to view or shoot an image. Thus, wireless LAN connection is disabled. Therefore, if the memory card is not inserted, the control unit 101 writes the wireless LAN connection disable state in the tag memory 113. On the other hand, if the memory card is inserted, the control unit 101 writes the wireless LAN connection enable state in the tag memory 113.

Condition 5: Shooting State

If the digital camera 100 is performing shooting processing, no wireless LAN connection is performed due to the load of the control unit 101. In this embodiment, if the user operates and presses the release switch of the operation unit 105 halfway, the control unit 101 writes the wireless LAN connection disable state in the tag memory 113. On the other hand, if the user ends the operation of the release switch of the operation unit 105 to cancel a halfway pressing state, the control unit 101 writes the wireless LAN connection enable state in the tag memory 113.

Condition 6: Moving Image Shooting State

If the digital camera 100 is performing moving image shooting, no wireless LAN connection is performed due to the load of the control unit 101. In this embodiment, if the moving image shooting switch is turned on by a user operation, the control unit 101 writes the wireless LAN connection disable state in the tag memory 113. On the other hand, if the moving image shooting switch is turned off by a user operation, the control unit 101 writes the wireless LAN connection enable state in the tag memory 113.

With respect to the above six conditions, at least one condition for disabling wireless LAN connection is satisfied, the control unit 101 writes the wireless LAN connection disable state in the tag memory 113. In addition to the conditions, there may be conditions for setting the wireless LAN connection disable state. The control unit 101 confirms, at predetermined time intervals, whether the above conditions are satisfied.

Note that in addition to the above conditions, the control unit 101 periodically checks the remaining capacity of the battery. The remaining capacity of the battery is checked independently of determination of the internal state using the above conditions. As a condition used to check the remaining capacity of the battery, a condition different from those for determining the internal state is used. This is done to determine whether power necessary for a minimum operation remains. Therefore, the determination level is lower than that of the conditions for determining whether wireless LAN connection is possible, and the number of determination items is smaller than that for determining the internal state.

(Arrangement of Mobile Phone 300)

Figure 3A:
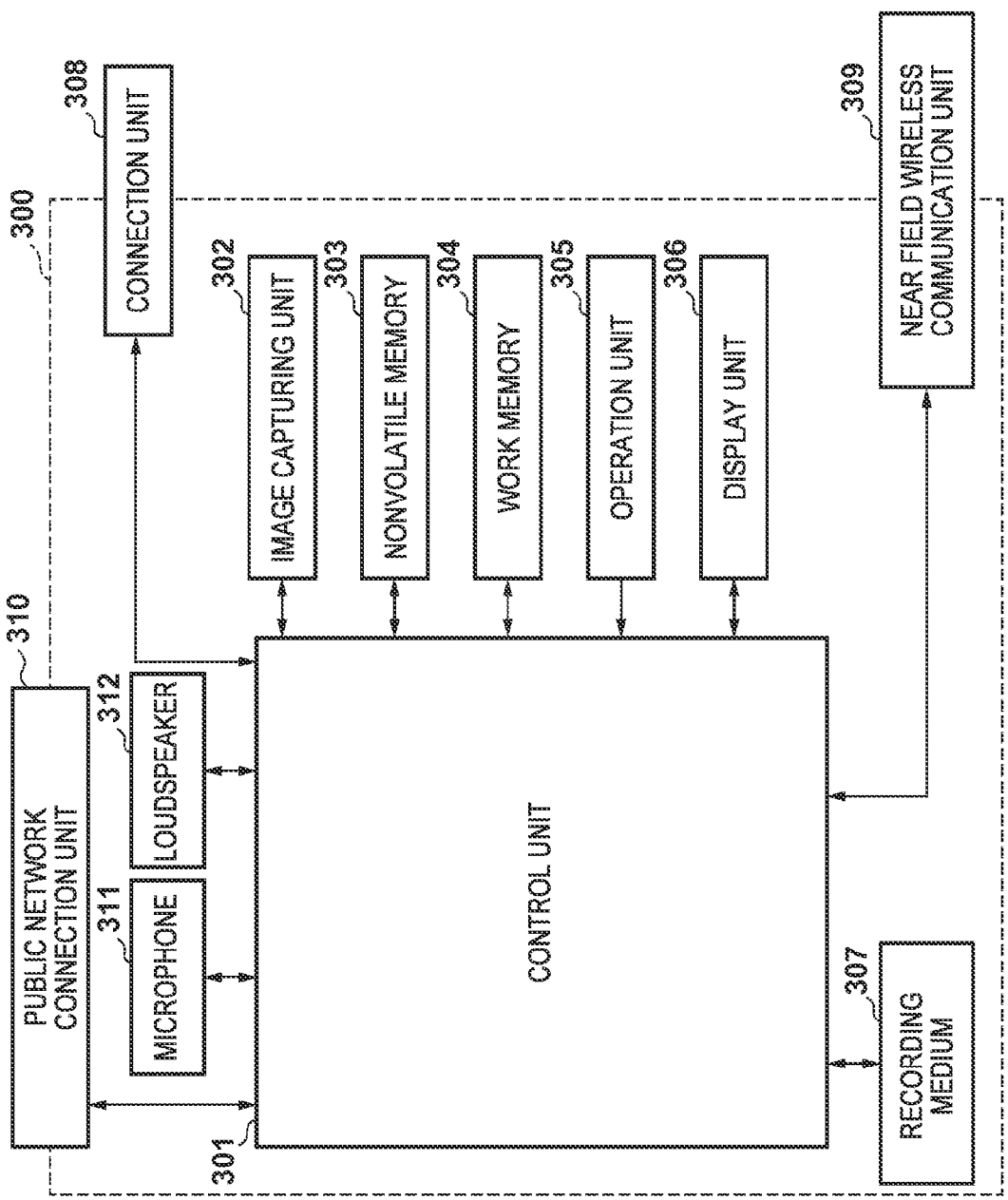
FIG. 3A is a block diagram showing an example of the functional arrangement of a mobile phone according to the embodiment.

FIG. 3A is a block diagram showing an example of the functional arrangement of the mobile phone 300 as an example of an information processing apparatus according to this embodiment. Note that the mobile phone will be described as an example of the information processing apparatus but the information processing apparatus is not limited to this. For example, the information processing apparatus may be a digital camera, tablet device, or personal computer, which has a wireless function.

Among respective functional blocks shown in FIG. 3A, a control unit 301, image capturing unit 302, work memory 304, and recording medium 307 are the same as the control unit 101, image capturing unit 102, work memory 104, and recording medium 110 of the digital camera 100, respectively, and a description thereof will be omitted.

A nonvolatile memory 303 is an electrically erasable/recordable nonvolatile memory. The nonvolatile memory 303 records an OS (Operating System) as basic software executed by the control unit 301, and application software for implementing an application function in cooperation with the OS. In this embodiment, the nonvolatile memory 303 stores application software (to be referred to as a communication connection application hereinafter) for communicating with the digital camera 100.

An operation unit 305 is used to accept an instruction to the mobile phone 300 from the user. The operation unit 305 includes, for example, a power button used by the user to instruct ON/OFF of the power of the mobile phone 300, and an operation member such as a touch panel formed on a display unit 306.

The display unit 306 displays image data, characters for an interactive operation, and the like. Note that the display unit 306 need not always be incorporated in the mobile phone 300. The mobile phone 300 can be connected to the display unit 306, and need only have at least a display control function of controlling display of the display unit 306.

A connection unit 308 is an interface for connecting an external apparatus. The mobile phone 300 according to this embodiment can exchange data with the digital camera 100 via the connection unit 308. In this embodiment, the connection unit 308 is an antenna, and the control unit 301 can be connected to the digital camera 100 via the antenna. Note that the mobile phone 300 may be connected to the digital camera 100 directly or via an access point. For example, the mobile phone 300 can join a network generated when the digital camera 100 operates in a simple AP mode, and establish a connection via the wireless LAN. As a protocol for communicating data, for example, PTP/IP (Picture Transfer Protocol over Internet Protocol) via the wireless LAN can be used. Note that communication with the digital camera 100 is not limited to this, and various modules can be adopted, similarly to the connection unit 111 of the digital camera 100.

A near field wireless communication unit 309 is a communication unit for implementing near field wireless communication with an external device. The near field wireless communication unit 309 includes an antenna for wireless communication, a modulation/demodulation circuit for processing a wireless signal, and a communication controller. The near field wireless communication unit 309 implements non-contact near field communication by outputting a modulated wireless signal from the antenna, and demodulating a wireless signal received by the antenna. In this example, non-contact communication complying with NFC is implemented. Upon receiving a data readout request from another device, the near field wireless communication unit 309 outputs response data based on data stored in the nonvolatile memory 303. In this embodiment, the mobile phone 300 operates, via the near field wireless communication unit 309, in a card reader mode, card writer mode, and P2P mode which are defined in the NFC standard, and mainly operates as an initiator. To the contrary, the digital camera 100 mainly operates as a target via the near field wireless communication unit 112.

A public network connection unit 310 is an interface used to perform public wireless communication. The mobile phone 300 can perform voice communication with another mobile phone via the public network connection unit 310. At this time, the control unit 301 implements voice communication by inputting and outputting voice signals via a microphone 311 and loudspeaker 312. In this embodiment, the public network connection unit 310 is an antenna, and the control unit 101 can be connected to the public network via the antenna. Note that the connection unit 308 and public network connection unit 310 can share one antenna.

(Arrangement of Data Server 400)

Figure 3B:
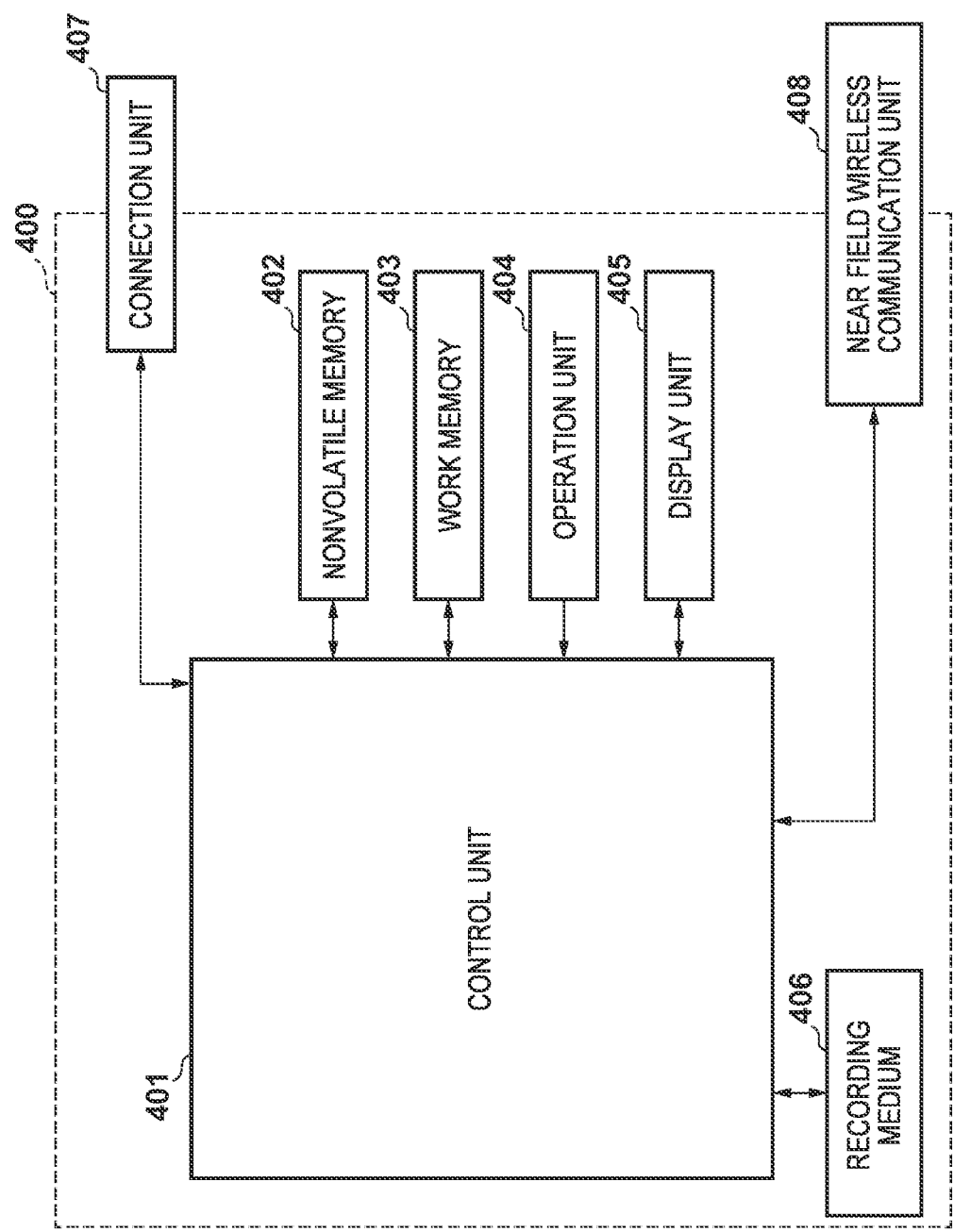
FIG. 3B is a block diagram showing an example of the functional arrangement of a data server according to the embodiment.

FIG. 3B is a block diagram showing an example of the functional arrangement of the data server 400 as an example of the information processing apparatus according to this embodiment. Note that the data server will be described as an example of the information processing apparatus but the information processing apparatus is not limited to this. For example, the information processing apparatus may be a tablet device, a personal computer, or the like.

A description of a control unit 401, nonvolatile memory 402, work memory 403, recording medium 406, and connection unit 407 among respective functional blocks shown in FIG. 3B will be omitted. That is, these functional blocks are the same as the control unit 101, nonvolatile memory 103, work memory 104, recording medium 110, and connection unit 111 of the digital camera 100. Furthermore, the connection unit 407 and a near field wireless communication unit 408 are the same as the connection unit 308 and near field wireless communication unit 309 of the mobile phone 300, respectively, and a description thereof will be omitted.

An operation unit 404 is used to accept an instruction to the data server 400 from the user. The operation unit 404 includes, for example, a power button used by the user to instruct ON/OFF of the power of the data server 400, and an operation member such as a touch panel formed on a display unit 405.

The display unit 405 displays image data, characters for an interactive operation, and the like. Note that the display unit 405 need not always be incorporated in the data server 400. The data server 400 can be connected to the display unit 405, and need only have at least a display control function of controlling display of the display unit 405.

(Configuration of Network System)

Figure 4A:
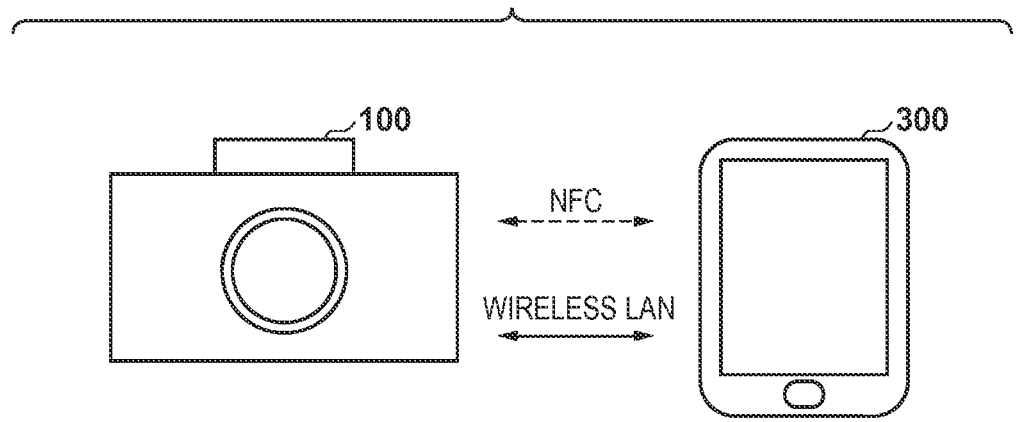
FIGS. 4A and 4B are views each showing the network configuration of the digital camera and the mobile phone or data server according to the embodiment.
Figure 4B:
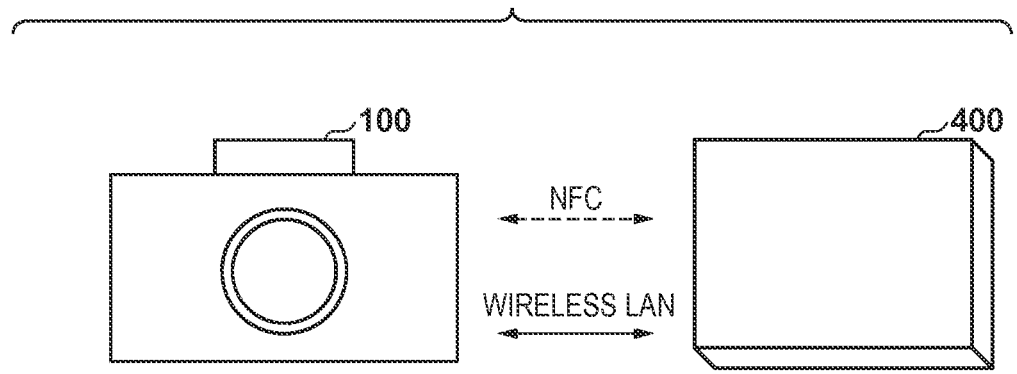

FIGS. 4A and 4B each schematically show an example of a network system according to this embodiment. Referring to FIG. 4A, the network system includes the digital camera 100 and the mobile phone 300, and each apparatus can perform communication by two independent wireless communication methods, that is, wireless communication by NFC and wireless communication by the wireless LAN.

As described above, as for wireless communication by NFC, communication is executed by a method in which the mobile phone 300 having the reader/writer function reads/writes information from/in the tag memory 113 of the digital camera 100.

As for wireless communication by the wireless LAN, communication is executed by a method in which the digital camera 100 has an access point function and the mobile phone 300 joins, as a client in the infrastructure mode, the wireless LAN network generated by the digital camera 100.

When the digital camera 100 and the mobile phone 300 perform handover connection, the user operates the mobile phone 300 to remotely operate the digital camera 100 after wireless LAN connection. At this time, the digital camera 100 transfers image data recorded in the recording medium 110 to the mobile phone 300. When an abnormality occurs in wireless LAN communication after NFC wireless communication, the user can notice the occurrence of the abnormality based on a situation in which, for example, image data from the mobile phone 300 is not displayed, since the user operates the mobile phone 300. Note that an example of the abnormality is interruption (after that, disconnection) of the wireless LAN connection due to a shortage of the remaining capacity of the battery of the digital camera 100.

Since the user operates the mobile phone 300 to remotely operate the digital camera 100, it is desirable that both the apparatuses enter an operable state immediately after connection (that is, handover) processing of the apparatuses. To set the operable state immediately after connection processing, it is necessary to shorten the time until a connection is established as much as possible. To do this, in this embodiment, whether the remaining capacity of the battery is enough is not determined when performing handover connection to the mobile phone. That is, since shortening the time from when NFC wireless communication is performed until a wireless LAN connection is established is prioritized, the remaining capacity of the battery is not determined before wireless LAN connection is performed after NFC wireless communication is performed.

FIG. 4B is a view for explaining an example of a system in which the digital camera 100 and the data server 400 are wirelessly, communicably connected. As shown in FIG. 4B, the network system includes the digital camera 100 and the data server 400, and each apparatus can perform communication by wireless communication by NFC and wireless communication by the wireless LAN, similarly to FIG. 4A.

As described above, as for wireless communication by NFC, communication is executed by a method in which the data server 400 having the reader/writer function reads/writes information from/in the tag memory 113 of the digital camera 100.

As for wireless communication by the wireless LAN, communication is executed by a method in which the data server 400 has the access point function and the digital camera 100 joins, as a client in the infrastructure mode, the wireless LAN network generated by the data server 400.

When the digital camera 100 and the data server 400 perform handover connection, the user does not operate the digital camera 100 or data server 400 in some cases after wireless LAN connection. Especially, along with a recent increase in recording capacity of a recording medium, the number of images or the data amount which can be captured and recorded by the digital camera 100 significantly increases. That is, it takes time to complete the backup operation of all images captured by the digital camera 100. If the purpose is the backup operation of images, the user is near the digital camera 100 at a low probability. Consequently, if an abnormality occurs in wireless LAN communication after NFC wireless communication, the user may not notice the abnormality.

As described above, at the time of a handover with the data server, it is necessary to notify the user at an earlier stage that communication cannot be performed, as compared with a handover with the mobile terminal. To do this, when performing handover connection to the data server, the digital camera 100 according to this embodiment prioritizes an operation of determining whether the remaining capacity of the battery is enough to perform a backup operation and notifying the user of the determination result over an operation of shortening the time until wireless LAN connection is performed.

(Connection Sequence between Digital Camera 100 and Mobile Phone 300)

A processing procedure associated with connection between the digital camera 100 and mobile phone 300 will be described with reference to FIG. 5. Note that this processing starts when the digital camera 100 and mobile phone 300 fall within a range where NFC wireless communication is possible and thus NFC wireless communication is established. Note also that processing by each of the digital camera 100 and mobile phone 300 is implemented when the corresponding control unit executes the programs stored in the nonvolatile memory.

In step S501, the control unit 301 of the mobile phone 300 reads out information from the tag memory 113 of the digital camera 100 via the near field wireless communication unit 309. The tag memory 113 of the digital camera 100 stores the wireless LAN connection enable/disable state written by the control unit 101, as described above.

In step S502, if the readout wireless LAN connection enable/disable state indicates the wireless LAN connection enable state, the control unit 301 writes the device information of the mobile phone 300 in the tag memory 113 via the near field wireless communication unit 309. Note that the wireless LAN connection enable state is a state in which conditions for enabling wireless LAN connection with respect to all the conditions described in FIG. 2 are satisfied.

In step S507, the control unit 301 starts wireless LAN connection after writing the device information in the tag memory 113 of the digital camera 100 via the near field wireless communication unit 309. At this time, assume that the information read out by the control unit 301 in step S501 includes information such as an SSID necessary for wireless LAN connection.

In step S503, the control unit 101 of the digital camera 100 detects that the information has been written in the tag memory 113.

In step S504, the control unit 101 obtains the device information written in the tag memory 113. In step S505 the control unit 101 determines, based on the device information, whether a connection device with which NFC wireless communication has been performed is the mobile phone or data server. Even for a connection device other than these devices, for example, device table information for classifying in advance devices of the first type including the mobile phone and devices of the second type including the data server is referred to and the device information obtained in step S502 is collated. In this way, it is possible to determine whether the connection device is handled as the mobile phone or data server.

If it is determined that the connection device is the mobile phone, the control unit 101 operates, in step S506, the digital camera 100 in the AP mode, and generates a network by transmitting a beacon containing the SSID transmitted by NFC. At this time, the control unit 101 may display, on the display unit 106, a screen for notifying the user of a wireless LAN connection state. In this way, it is possible to notify the user that NFC wireless communication has ended and communication can be continued even if the distance between the digital camera 100 and the mobile phone 300 is increased.

In step S508, the control unit 301 of the mobile phone 300 controls the connection unit 308 to join the wireless LAN network generated by the digital camera 100 operating in the AP mode. More specifically, the control unit 301 transmits a request to join the network to the digital camera 100. This processing may be periodically executed after step S502, or executed after receiving the beacon from the digital camera 100 and confirming that the SSID of the beacon is equal to the SSID read out in step S501. If the digital camera 100 returns a permission response to this request, a wireless LAN connection between the digital camera 100 and the mobile phone 300 is established in step S508.

In step S509, the control unit 101 confirms the internal state of the digital camera 100 after wireless LAN connection to the mobile phone 300. If the control unit 101 determines that the wireless LAN connection cannot be continued, it notifies the mobile phone 300 that the wireless LAN connection cannot be continued, and disconnects the connected wireless LAN connection. On the other hand, if it is determined that the wireless LAN connection can be continued, the process advances to step S510.

In step S510, the control unit 101 notifies the mobile phone 300 of a wireless LAN connection preparation completion state. The wireless LAN connection preparation completion state is a state in which there are no other abnormalities in addition to the wireless LAN connection enable state shown in FIG. 2. For example, the conditions for enabling wireless LAN connection with respect to all the conditions shown in FIG. 2 are satisfied and the remaining capacity of the battery is larger than a predetermined remaining capacity. Upon receiving the notification of the wireless LAN connection preparation completion state, the control unit 301 can determine to continue wireless LAN communication with the digital camera 100.

The digital camera 100 and mobile phone 300 further perform wireless LAN communication for data transfer or the like, thereby terminating the series of operations. Note that the processes in steps S509 and S510 are executed in parallel to selection and transmission of a content to be transmitted from the digital camera 100 to the mobile phone 300 in wireless LAN communication.

Note that the processes in steps S509 and S510 need not be executed at the above-described timings. The control unit 101 periodically checks the remaining capacity of the battery of the digital camera 100, and if it is determined that the wireless LAN connection cannot be maintained, the processing in step S509 can be executed to disconnect the wireless LAN connection.

(Connection Sequence between Digital Camera 100 and Data Server 400)

Figure 6:
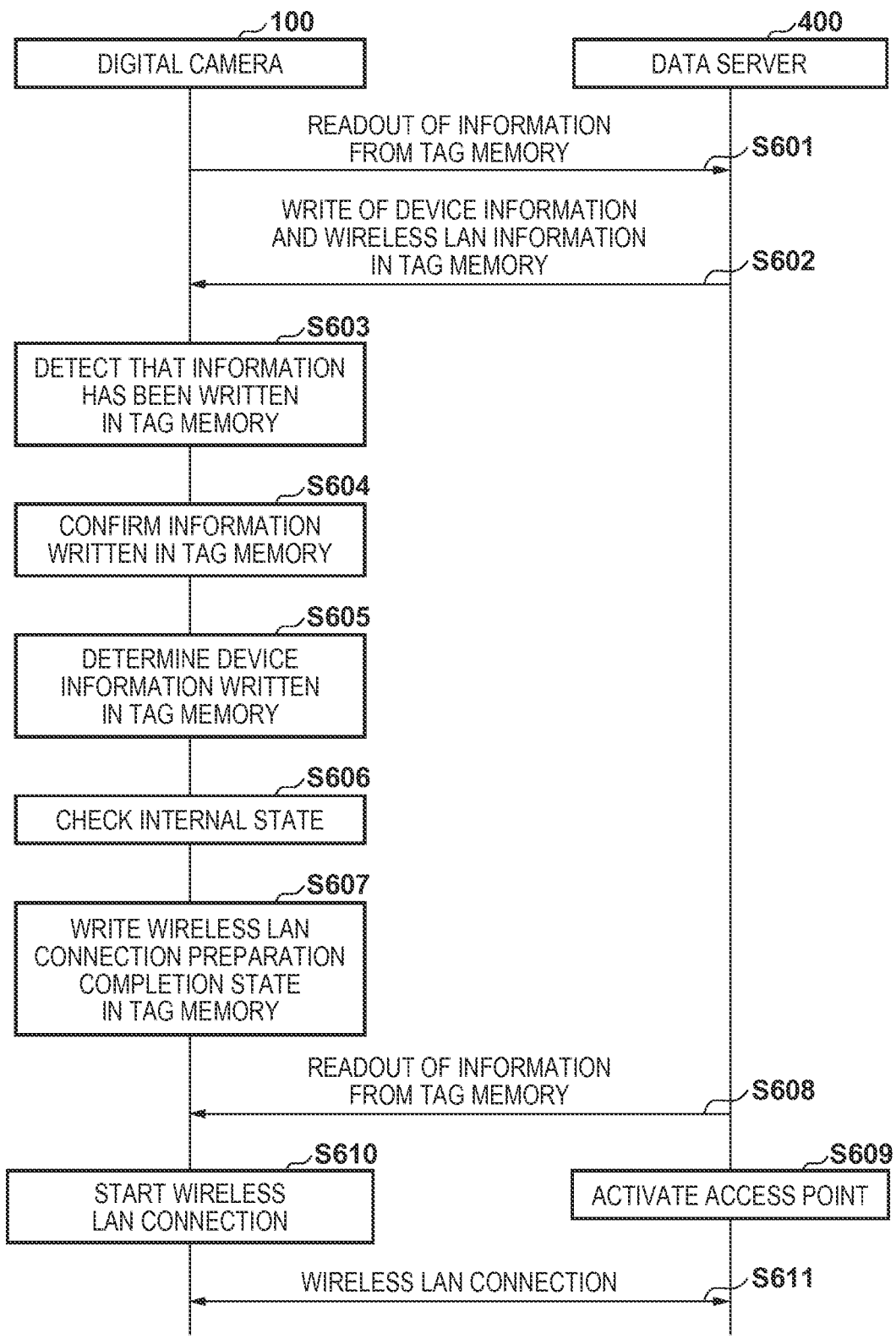
FIG. 6 is a sequence chart showing a connection sequence between the digital camera and the data server.

A processing procedure associated with connection between the digital camera 100 and data server 400 will be described with reference to FIG. 6. Similarly to FIG. 5, when the digital camera 100 and data server 400 fall within a range where NFC wireless communication is possible and thus NFC wireless communication is established, this processing starts. A series of operations by the data server 400 is implemented when the control unit 401 executes programs stored in the nonvolatile memory 402.

In step S601, the control unit 401 of the data server 400 reads out the information from the tag memory 113 of the digital camera 100 via the near field wireless communication unit 408.

In step S602, if the control unit 401 determines that the digital camera 100 is in the wireless LAN connection enable state, the control unit 401 writes device information and wireless LAN information in the tag memory 113 of the digital camera 100 via the near field wireless communication unit 408. Note that the wireless LAN information includes information such as an SSID when the data server 400 operates as an access point in step S610 (to be described later).

The control unit 101 detects in step S603 that the information has been written in the tag memory 113, and confirms the written information in step S604. Based on the information written in the tag memory 113, the control unit 101 determines in step S605 whether a connection device with which NFC wireless communication has been performed is the mobile phone or data server. Note that the processing of determining the connection device is the same as that in step S505 described above.

If it is determined that the connection device is the data server, the control unit 101 confirms the internal state of the digital camera 100 in step S606 before the start of wireless LAN connection, unlike connection to the mobile phone 300. If, as a result of confirming the internal state, the control unit 101 determines that wireless LAN communication is impossible, the control unit 101 notifies the mobile phone 300 that wireless LAN communication is impossible, thereby terminating this flowchart without establishing a wireless LAN connection.

If the control unit 101 determines based on the result of confirming the internal state that wireless LAN communication is possible, it writes the wireless LAN connection preparation completion state in the tag memory 113 in step S607.

In step S608, the control unit 401 reads out information from the tag memory 113 again via the near field wireless communication unit 408. At this time, the control unit 401 may repeat the readout operation a plurality of times until the wireless LAN connection enable/disable state of the digital camera 100 is set to the wireless LAN connection preparation completion state. If it is determined that the wireless LAN connection enable/disable state of the digital camera 100 indicates the wireless LAN connection preparation completion state, the control unit 401 operates the data server 400 in the AP mode in step S609, thereby generating a network using the wireless LAN information written in step S602.

On the other hand, when the information is read out from the tag memory 113 in step S608, the digital camera 100 starts wireless LAN connection in step S610. That is, the digital camera 100 starts transmission of a request to join the network generated by the data server 400. At this time, the digital camera 100 displays, on the display unit 106, a screen for notifying the user of the wireless LAN connection state. With this processing, it is possible to notify the user that NFC wireless communication has ended and wireless LAN communication can be continued even if the distance between the digital camera 100 and the data server 400 is increased. Alternatively, since it can be assumed that the user leaves the digital camera 100 and data server 400 without operating them during wireless LAN communication, the control unit 101 may suppress the power consumption by displaying nothing on the display unit 106.

If the data server 400 receives the join request from the digital camera 100 in step S610, and returns a response to permit the digital camera 100 to join the network, a wireless LAN connection between the digital camera 100 and the data server 400 is established in step S611.

(Series of Operations of Connection Processing in Digital Camera 100)

Figure 7:
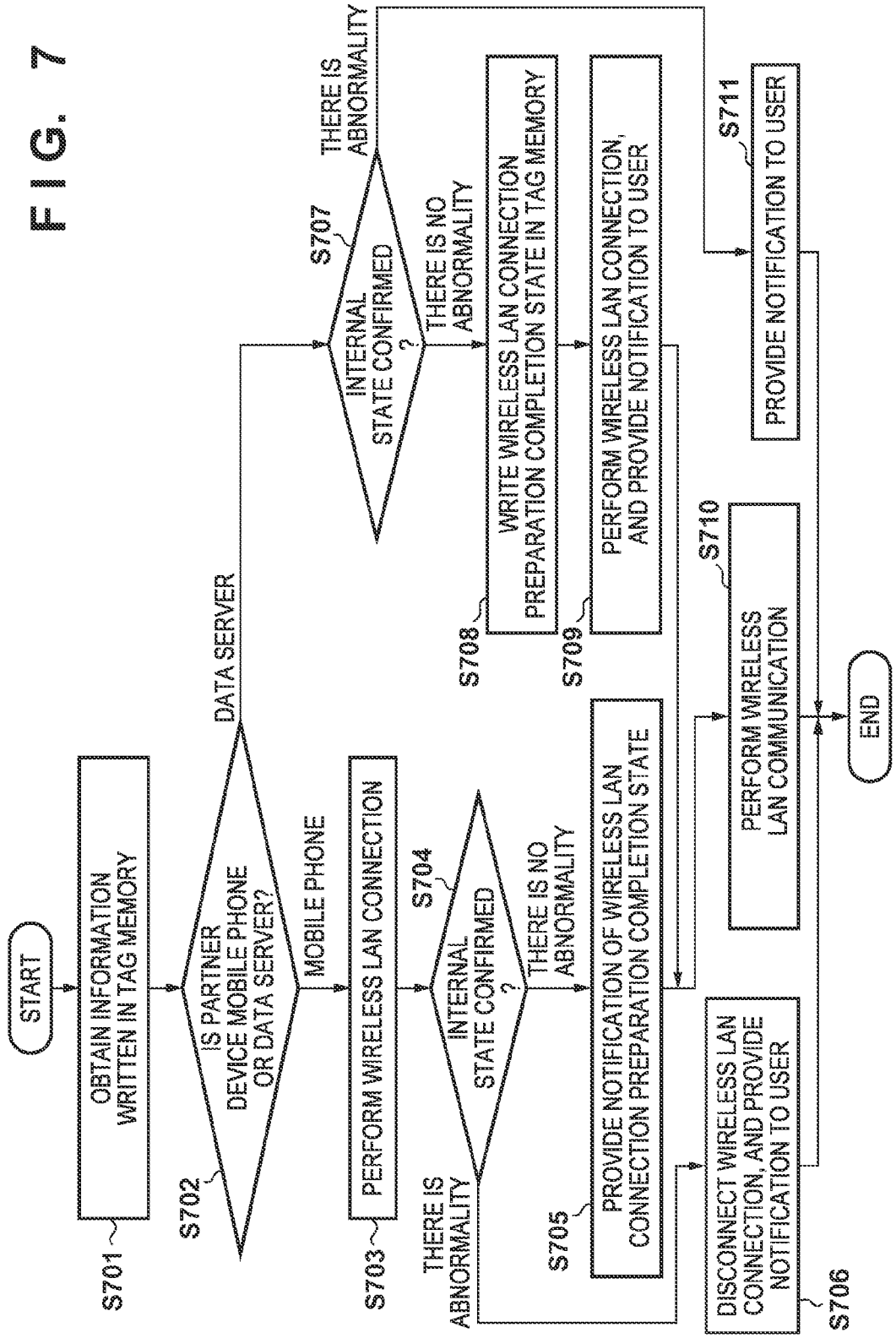
FIG. 7 is a flowchart illustrating a series of operations of connection processing in the digital camera according to the first embodiment.

A series of operations of connection processing in the digital camera 100 will be described with reference to FIG. 7. Note that this processing starts when it is detected that a connection device writes information in the tag memory 113 via NFC wireless communication in step S503 of FIG. 5 described above or step S603 of FIG. 6 described above. Similarly to the operations of the above-described sequence, the series of operations by the digital camera 100 is implemented when the control unit 101 executes the programs stored in the nonvolatile memory 103.

In step S701, the control unit 101 confirms the information written in the tag memory 113. The control unit 101 obtains the device information of the connection device from the information written in the tag memory 113. If the connection device is the data server 400, the written information includes wireless LAN information, and thus the control unit 101 also obtains the wireless LAN information.

In step S702, based on the written information, the control unit 101 determines whether the connection device is the mobile phone or data server. The processing of determining whether the connection device is the mobile phone 300 or data server 400 is the same as that in step S505 described above. If the control unit 101 determines that the connection device is the mobile phone 300, it advances the process to step S703. If the control unit 101 determines that the connection device is the data server 400, it advances the process to step S707.

In step S703, the control unit 101 performs wireless LAN connection to the mobile phone 300. At this time, the control unit 101 controls the connection unit 111 to operate the digital camera 100 in the AP mode.

In step S704, since the connection device is the mobile phone 300, the control unit 101 confirms the internal state after wireless LAN connection, and determines whether there is an abnormality in wireless LAN communication. The control unit 101 confirms the remaining capacity of the battery of the digital camera 100 as confirmation contents of the internal state. If, for example, the remaining capacity of the battery is larger than the predetermined remaining capacity, the control unit 101 determines that there is no abnormality, and advances the process to step S705. On the other hand, if the remaining capacity of the battery is smaller than the predetermined remaining capacity, the control unit 101 determines that there is an abnormality in wireless LAN communication, and advances the process to step S706.

In step S705, the control unit 101 notifies the mobile phone 300 of the above-described wireless LAN connection preparation completion state. In step S710, the control unit 101 performs wireless LAN communication with the mobile phone 300 via the connection unit 111. After wireless LAN connection, the user can operate the mobile phone 300, and transfer image data recorded in the recording medium 110 of the digital camera 100 to the mobile phone 300.

In step S706, based on the determination result that there is an abnormality in wireless LAN communication, the control unit 101 disconnects the wireless LAN connection via the connection unit 111. At this time, the control unit 101 may display, on the display unit 106, information indicating that the wireless LAN connection is to be disconnected due to the occurrence of the abnormality, thereby notifying the user of it. Alternatively, before disconnecting the wireless LAN connection, the control unit 101 may communicate with the mobile phone 300, and display the occurrence of the abnormality on the display unit 306 of the mobile phone 300. With this operation, the user can grasp disconnection of the wireless LAN connection through the display unit of one of the mobile phone 300 and digital camera 100. Upon end of the processing in this step, the control unit 101 terminates the series of operations of this processing.

If the connection device is the data server, the control unit 101 confirms the internal state in step S707 before the start of wireless LAN connection. Confirmation of the internal state is equivalent to, for example, confirmation of the remaining capacity of the battery of the digital camera 100, similarly to step S704. If, for example, the remaining capacity of the battery is larger than the predetermined remaining capacity, the control unit 101 determines that there is no abnormality, and advances the process to step S708. On the other hand, if the remaining capacity of the battery is smaller than the predetermined remaining capacity, the control unit 101 determines that there is an abnormality in wireless LAN communication, and advances the process to step S711.

The control unit 101 writes the wireless LAN connection preparation completion state in the tag memory 113 in step S708, and performs wireless LAN communication with the data server 400 in step S709. At this time, since the data server 400 operates in the AP mode, the control unit 101 joins, as a client in the infrastructure mode via the connection unit 111, the wireless LAN network generated by the data server 400. At this time, the control unit 101 may display, on the display unit 106, information indicating that the wireless LAN connection has been established, thereby notifying the user of it.

In step S710, the control unit 101 performs wireless LAN communication, and transmits image data recorded in the recording medium 110 to the data server 400 to perform a backup operation, thereby terminating the series of operations of this processing.

In step S711, the control unit 101 notifies the user that the abnormality has occurred or wireless LAN connection has not been completed. The notification to the user is provided by displaying the occurrence of the abnormality on the display unit 106 of the digital camera 100. After that, the control unit 101 terminates the series of operations of this processing without performing wireless LAN connection.

In this embodiment, in addition to the wireless LAN connection enable state, the condition that the remaining capacity of the battery of the digital camera 100 is larger than the predetermined remaining capacity has been exemplified as a condition for determining wireless LAN connection preparation completion. This is an example in which the condition for determining wireless LAN connection preparation completion is stricter than those for determining the wireless LAN connection enable state among the conditions for determining the wireless LAN connection enable/disable state. This is because even if the conditions for enabling wireless LAN connection with respect to all the conditions shown in FIG. 2 are satisfied, the remaining capacity of the battery may become short during wireless LAN communication with the connection device and wireless LAN communication may be interrupted.

Especially when the digital camera 100 is connected to the data server 400, image data saved in the recording medium 110 of the digital camera 100 are backed up, and thus it is assumed that if the data amount is large, it may take long time to perform wireless LAN communication and the remaining capacity of the battery may become short during communication. Therefore, when the digital camera 100 is connected to the data server 400, it is necessary to confirm, before performing wireless LAN connection, whether image data can be transmitted (that is, backed up) with the current remaining capacity of the battery. Furthermore, even if the user may operate the data server 400 during wireless LAN communication, if it takes time to perform wireless LAN communication by exchanging a large amount of image data, it is necessary to confirm the remaining capacity of the battery of the device before performing wireless LAN connection.

On the other hand, when the digital camera 100 is connected to the mobile phone 300, it is assumed that the user transfers only images selected in the mobile phone instead of transmitting all the images saved in the recording medium 110. In this case, wireless LAN communication is performed for a shorter time as compared with connection to the data server 400. In addition, when the remaining capacity of the battery of the digital camera 100 reduces during wireless LAN communication, the user can notice the remaining capacity of the battery at this point of time.

In consideration of the above-described points, different determination processes based the remaining capacity of the battery may be performed depending on whether the digital camera 100 is connected to the data server 400 or the mobile phone 300. For example, if the remaining capacity of the battery is 30% or less, it is determined in step S707 that there is an abnormality, and no wireless LAN connection to the data server 400 is performed. On the other hand, when the digital camera 100 is connected to the mobile phone 300, if the remaining capacity of the battery is 10% or less, it is determined in step S704 that there is an abnormality; otherwise, wireless LAN connection is performed. Furthermore, the threshold of the remaining capacity of the battery for determining an abnormality may be increased in accordance with the data amount of image data to be transferred, and the necessary remaining capacity of the battery may be determined by calculating the time required to transfer the data amount.

(Series of Operations of Connection Processing in Mobile Phone 300)

Figure 8:
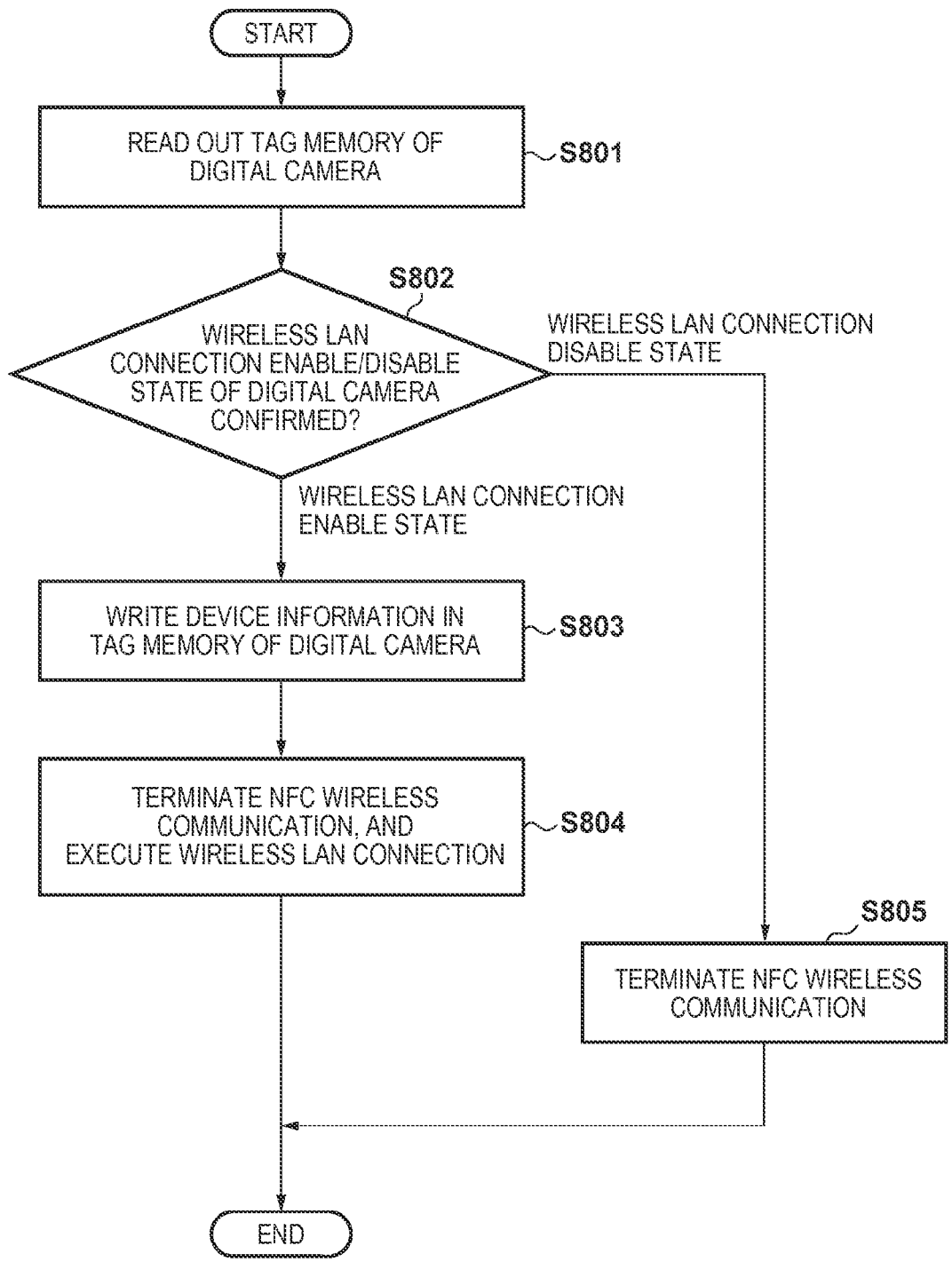
FIG. 8 is a flowchart illustrating a series of operations of connection processing in the mobile phone according to the first embodiment.

A series of operations of connection processing in the mobile phone 300 will be described with reference to FIG. 8. Note that this processing starts when the digital camera 100 and the mobile phone 300 are brought closer to each other and NFC wireless communication is established. Similarly to the operations of the above-described sequence, the series of operations by the mobile phone 300 is implemented when the control unit 301 executes the programs stored in the nonvolatile memory 303.

In step S801, the control unit 301 reads out the information from the tag memory 113 of the digital camera 100 via the near field wireless communication unit 309. More specifically, the control unit 301 reads out the information indicating the wireless LAN connection enable/disable state described in the tag memory 113 of the digital camera 100.

In step S802, based on the wireless LAN connection enable/disable state of the digital camera 100, the control unit 301 determines whether the digital camera 100 is in the wireless LAN connection enable state. If the wireless LAN connection enable/disable state indicates the wireless LAN connection enable state, the control unit 301 advances the process to step S803. If the wireless LAN connection enable/disable state indicates the wireless LAN connection disable state, the control unit 301 advances the process to step S805.

In step S803, the control unit 301 writes the device information of the self apparatus to be used to perform wireless LAN connection in the tag memory 113 of the digital camera 100. In step S804, the control unit 301 terminates NFC wireless communication, and executes wireless LAN connection to the digital camera 100.

In step S805, since the digital camera 100 is in the wireless LAN connection disable state, the control unit 301 terminates NFC wireless communication without performing wireless LAN connection.

(Series of Operations of Connection Processing in Data Server 400)

A series of operations of connection processing in the data server 400 will be described with reference to FIG. 9. Note that this processing starts when the digital camera 100 and the data server 400 are brought closer to each other and NFC wireless communication is established. Similarly to the operations of the above-described sequence, the series of operations by the data server 400 is implemented when the control unit 401 executes the programs stored in the nonvolatile memory 402.

In step S901, the control unit 401 reads out the information from the tag memory 113 of the digital camera 100 via the near field wireless communication unit 408. More specifically, the control unit 401 reads out the information indicating the wireless LAN connection enable/disable state described in the tag memory 113 of the digital camera 100.

In step S902, based on the wireless LAN connection enable/disable state of the digital camera 100, the control unit 401 determines whether the digital camera 100 is in the wireless LAN connection enable state. If the wireless LAN connection enable/disable state indicates the wireless LAN connection enable state, the control unit 401 advances the process to step S903. If the wireless LAN connection enable/disable state indicates the wireless LAN connection disable state, the control unit 401 advances the process to step S909.

In step S903, the control unit 401 writes the device information and wireless LAN information of the self apparatus to be used to perform wireless LAN connection in the tag memory 113 of the digital camera 100. In step S904, the control unit 401 terminates NFC wireless communication, and executes wireless LAN connection to the digital camera 100.

In step S904, the control unit 401 performs again the readout operation of the tag memory 113 of the digital camera 100 via the near field wireless communication unit 408.

In step S905, the control unit 401 determines whether the wireless LAN connection enable/disable state of the digital camera 100 indicates the wireless LAN connection preparation completion state. If the wireless LAN connection enable/disable state indicates the wireless LAN connection preparation completion state, the control unit 401 advances the process to step S907; otherwise, the control unit 401 advances the process to step S906.

In step S907, based on the determination result that the digital camera 100 can perform wireless LAN communication, the control unit 401 terminates NFC wireless communication, and starts wireless LAN connection. Upon completion of wireless LAN connection, the control unit 401 terminates the series of operations of the processing.

In step S906, since the digital camera 100 is not in the wireless LAN connection preparation completion state, the control unit 401 confirms whether the readout operation of the tag memory 113 via the near field wireless communication unit 408 has been repeated for a predetermined time. If the control unit 401 determines that the processing has not been repeated for the predetermined time, it returns the process to step S904 to repeat the processing. On the other hand, if the control unit 401 determines that the processing has been repeated for the predetermined time, it determines that the digital camera 100 is not in the wireless LAN connection preparation completion state, and advances the process to step S908. At this time, in step S908, the control unit 401 terminates NFC wireless communication without performing wireless LAN connection.

In step S909, since the digital camera 100 is in the wireless LAN connection disable state, the control unit 401 terminates NFC wireless communication without performing wireless LAN connection.

As described above, according to this embodiment, in accordance with the connection device obtained by NFC wireless communication, the internal state of the digital camera 100 is confirmed during NFC wireless communication to determine whether data communication by the wireless LAN is possible. That is, when connecting the digital camera and a device such as a stationary device for which the user performs no operation after wireless LAN connection, whether data communication by the wireless LAN is possible is determined during NFC wireless communication. In this case, if it is determined that data communication is impossible, the user is notified of the occurrence of an abnormality without executing wireless LAN communication. With this processing, upon completion of NFC wireless communication, the user can be notified that it is impossible to execute wireless LAN communication between the digital camera 100 and the data server 400, thereby preventing the user from misunderstanding that wireless LAN communication is in progress. On the other hand, when performing connection to a device such as a mobile phone which is held by the user to perform an operation, the internal state of the digital camera 100 is confirmed after completion of wireless LAN connection. This can complete handover processing within a shorter time, and restart the operation of the mobile phone 300 within a shorter time. Therefore, it is possible to control a notification about communication after a handover in accordance with a connection partner device in near field wireless communication.

(Second Embodiment)

The second embodiment will be described. In the first embodiment, the digital camera 100 determines whether data communication by the wireless LAN is possible, by confirming the internal state such as the remaining capacity of the battery of the digital camera 100. The second embodiment is different from the first embodiment in that a free space of a recording medium 406 of a data server is obtained and the internal state is confirmed in consideration of the free space of a data server 400. Therefore, a digital camera and the data server according to this embodiment have the same arrangements as in the first embodiment except for the above-described point. The same reference numerals denote the same components, a repetitive description thereof will be omitted, and the differences will be mainly described.

(Series of Operations of Processing of Confirming State of Recording Medium in Data Server 400)

Figure 10A:
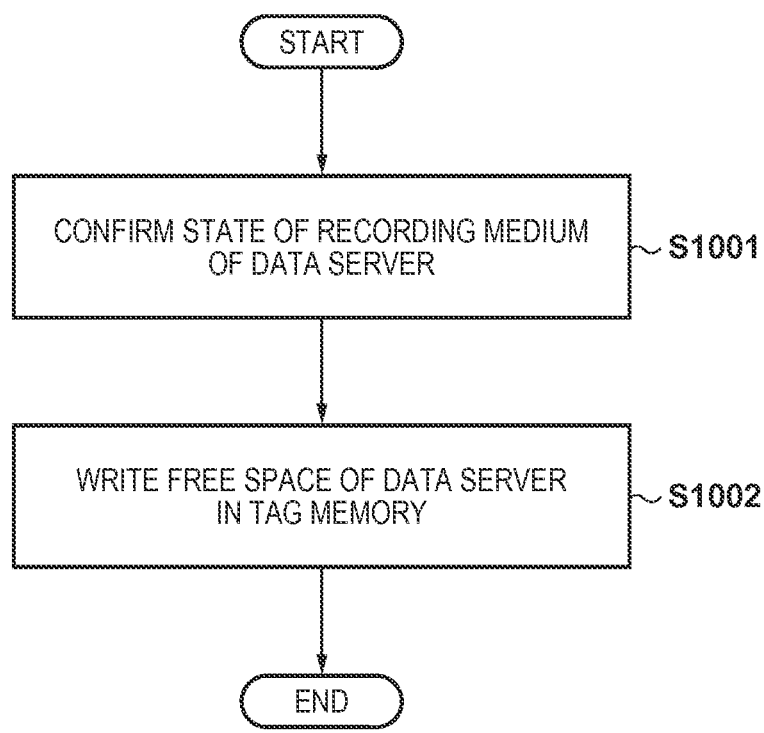
FIG. 10A is a flowchart illustrating a series of operations of processing of obtaining the state of a recording medium in a data server according to the second embodiment.

A series of operations of processing of confirming the state of the recording medium in the data server 400 will be described with reference to FIG. 10A. Note that this processing starts when a digital camera 100 and the data server 400 are brought closer to each other and NFC wireless communication is established. Upon completion of the operations of this processing, connection processing to the digital camera 100 shown in FIG. 9 is executed.

In step S1001, a control unit 401 of the data server 400 confirms the state of the recording medium 406, and obtains the free space of the recording medium 406.

In step S1002, the control unit 401 writes the obtained free space in a tag memory 113 of the digital camera 100 via a near field wireless communication unit 408. Upon completion of the write operation in the tag memory 113, the control unit 401 completes the series of operations of this processing.

(Series of Operations of Connection Processing in Digital Camera 100)

Figure 10B:
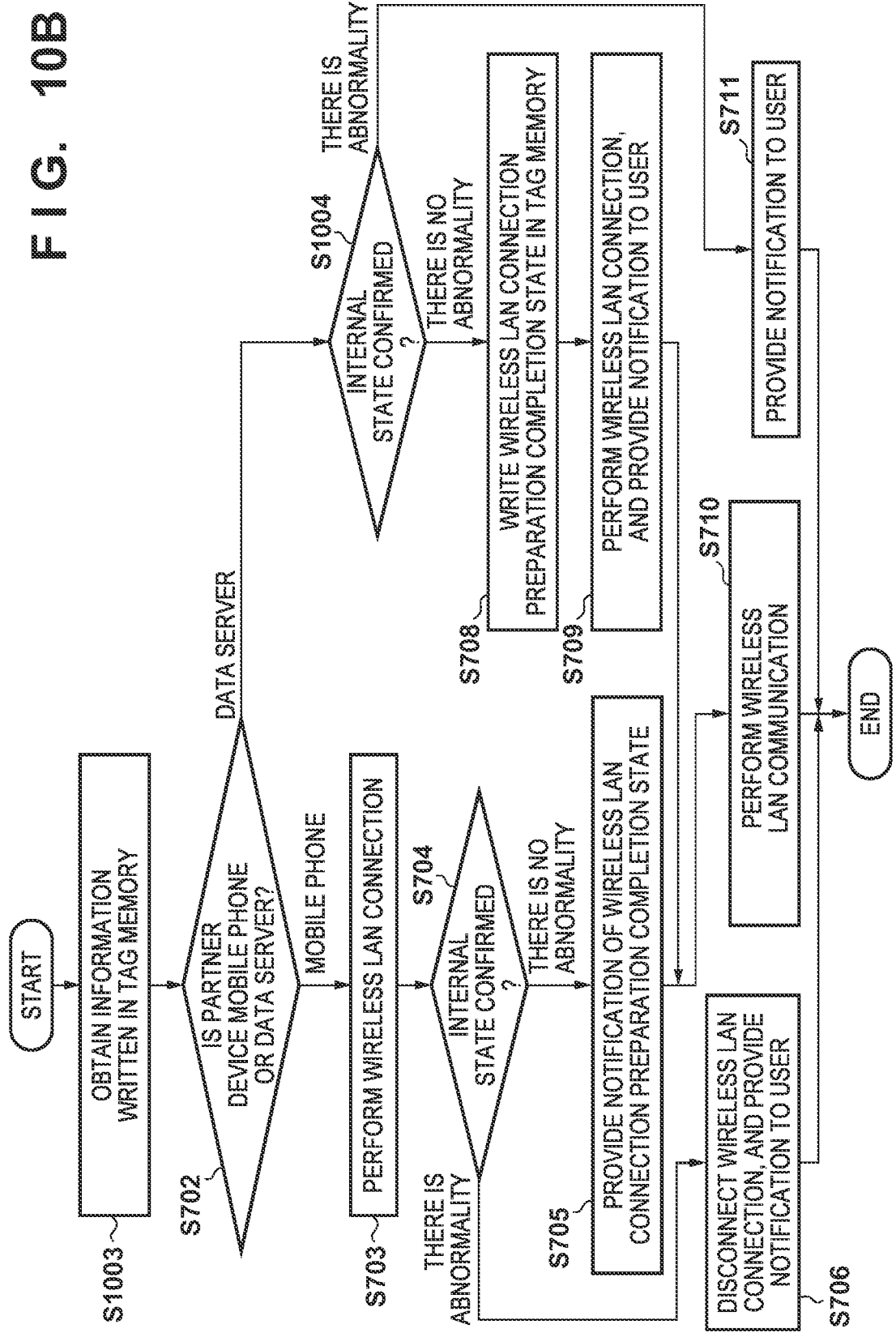
FIG. 10B is a flowchart illustrating a series of operations of connection processing in a digital camera according to the second embodiment.

Connection processing to the data server 400 by the digital camera 100 according to this embodiment will be described with reference to FIG. 10B.

In step S1003, the control unit 101 confirms information written in the tag memory 113. The control unit 101 obtains the device information, wireless LAN information, and free space of the data server 400 which have been written in the tag memory 113.

In step S1004, since a connection device is the data server, the control unit 101 confirms the internal state before the start of wireless LAN connection. Confirmation of the internal state in this step is equivalent to, for example, confirmation of a data amount to be transferred by the digital camera 100. If the data amount to be transferred is equal to or larger than the free space of the data server 400 obtained in step S1003, the control unit 101 determines that there is an abnormality in wireless LAN communication, and terminates the series of operations of this processing without performing wireless LAN connection. On the other hand, if the data amount to be transferred is smaller than the free space of the data server 400, the control unit 101 determines the wireless LAN connection preparation completion state, and advances the process to step S708 to perform wireless LAN connection. Note that in the internal state confirmation processing, the determination processing for the remaining capacity of the battery, which has been explained in step S707, may be further performed, and if it is determined in one of the determination processes that there is an abnormality, the process advances to step S711. This can avoid the situation in which an abnormality occurs after the start of data transfer to a device such as the data server 400 for which no operation is performed after NFC wireless communication, and thus data transfer is interrupted. In other words, when an abnormality is assumed, for example, when it is assumed that it is impossible to save data of the digital camera 100, it is possible to notify the user of it without performing wireless LAN connection.

Note that in step S1001 described above, the control unit 401 may confirm the state of the recording medium 406, and determine whether the free space is equal to or larger than a predetermined capacity. If the free space of the recording medium 406 is smaller than the predetermined capacity, the control unit 401 may determine that it is impossible to save the data of the digital camera 100, and terminate NFC wireless communication.

As described above, according to this embodiment, the free space of the data server 400 is transmitted to the digital camera 100 by near field wireless communication, and the digital camera 100 determines, in the internal state confirmation processing, whether a data amount to be transferred is smaller than the free space. If the data amount to be transferred is equal to or larger than the free space, the user is notified of the occurrence of an abnormality without performing wireless LAN connection. This makes it possible to control a notification about communication after a handover in accordance with a connection partner device in near field wireless communication.

Other Embodiments

In the above-described embodiments, a case in which in a handover with a mobile phone, the internal state is checked after the handover has been explained. For example, before a wireless LAN connection is established after NFC communication is performed, it may be simply determined whether connection is possible, under a condition that, for example, the mode of the digital camera 100 is an image capturing mode or moving image mode, which does not require a time to obtain. In this case, information such as the remaining capacity of the battery which requires a time to obtain is checked after wireless LAN connection. That is, the level of the condition to be checked at the time of a handover is changed according to a connection partner. This can provide a service at an appropriate processing speed according to the use scene of the user.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-182504, filed Sep. 8, 2014, which is hereby incorporated by reference herein in its entirety.

What is claimed is:

1. A communication apparatus connectable to an external apparatus via first communication unit and second communication unit different from the first communication unit, comprising:
an obtaining unit configured to obtain device information about the external apparatus from the external apparatus via the first communication unit;
a connection unit configured to perform connection processing to the external apparatus via the second communication unit based on the device information; and
a control unit configured to determine an internal state of the communication apparatus and to control a connection to the external apparatus via the second communication unit in accordance with a determination result,
wherein the control unit changes a determination timing in accordance with a type of the external apparatus determined based on the device information obtained via the first communication unit, the determination timing is a timing at which the control unit determines the internal state of the communication apparatus,
wherein the determination timing when the type of the external apparatus is not a handheld device is earlier than the determination timing when the type of the external apparatus is a handheld device.

2. The communication apparatus according to claim 1, wherein the control unit determines a remaining capacity of a battery as the internal state of the communication apparatus.

3. The communication apparatus according to claim 1, wherein the control unit periodically checks a remaining capacity of a battery, and
wherein the internal state of the communication apparatus is determined independently of the periodical check of the remaining capacity of the battery.

4. The communication apparatus according to claim 1, wherein
when the type of the external apparatus is a handheld device, the control unit executes determination of the internal state of the communication apparatus after connecting the external apparatus via the second communication unit, and
when the type of the external apparatus is not a handheld device, the control unit executes determination of the internal state of the communication apparatus before connecting the external apparatus via the second communication unit.

5. A communication apparatus connectable to an external apparatus via first communication unit and second communication unit different from the first communication unit, comprising:
an obtaining unit configured to obtain device information about the external apparatus from the external apparatus via the first communication unit; and
a control unit configured to control connection processing to the external apparatus via the second communication unit based on the device information,
wherein the control unit determines an internal state of the communication apparatus, and
wherein the control unit changes a determination level of the internal state of the communication apparatus in accordance with a type of the external apparatus from which the device information has been obtained via the first communication unit,
wherein a determination criterion used in determination of the internal state of the communication apparatus executed when the type of the external apparatus is not a handheld device is stricter than that used in determination of the internal state of the communication apparatus executed when the type of the external apparatus is a handheld device.

6. The communication apparatus according to claim 5, wherein the internal state of the communication apparatus includes a remaining capacity of a battery.

7. The communication apparatus according to claim 5, wherein the control unit periodically checks the internal state of the communication apparatus, and
wherein the internal state of the communication apparatus when the communication with the external apparatus is established is determined independently of the periodical check of the internal state.

8. The communication apparatus according to claim 7, wherein a determination criterion used in determination of the internal state of the communication apparatus is stricter than that used in the periodical check of the internal state.

9. The communication apparatus according to claim 7, wherein there are more determination items in determination of the internal state of the communication apparatus than in the periodical check of the internal state.

10. The communication apparatus according to claim 5, wherein the determination level when the type of the external apparatus is not a handheld device is set to a higher level than that when the type of the external apparatus is a handheld device.

11. The communication apparatus according to claim 5, wherein determination items used in determination of the internal state of the communication apparatus executed when the type of the external apparatus is not a handheld device are more than those used in determination of the internal state of the communication apparatus executed when the type of the external apparatus is a handheld device.

12. The communication apparatus according to claim 5, wherein the control unit changes a determination timing in accordance with the type of the external apparatus determined based on the device information obtained via the first communication unit.

13. The communication apparatus according to claim 5, wherein in accordance with the type of the external apparatus determined based on the device information obtained via the first communication unit, the control unit controls whether to establish a connection to the external apparatus via a network generated by the second communication unit or a network generated by the external apparatus.

14. The communication apparatus according to claim 5, wherein the first communication unit operates using power generated by an electromagnetic wave received from the external apparatus.

15. The communication apparatus according to claim 5, wherein the second communication unit has a communicable distance longer than that of the first communication unit, or a power consumption larger than that of the first communication unit.

16. The communication apparatus according to claim 5, wherein the control unit controls to transmit, to the external apparatus, information based on a determination result of the internal state of the communication apparatus, and
wherein in accordance with the type of the external apparatus from which the device information has been obtained via the first communication unit, the control unit controls whether to transmit the information based on the determination result of the internal state of the communication apparatus to the external apparatus via the first communication unit or the second communication unit.

17. The communication apparatus according to claim 5, further comprising:
image capturing unit configured to generate image data by capturing an object,
wherein if the communication apparatus is connected to the external apparatus via the second communication unit, the control unit controls the second communication unit to transmit the image data generated by the image capturing unit to the external apparatus.

18. A control method of a communication apparatus connectable to an external apparatus via first communication unit and second communication unit different from the first communication unit, the method comprising:
an obtaining step of obtaining device information about the external apparatus from the external apparatus via the first communication unit;
a connection step of performing connection processing to the external apparatus via the second communication unit based on the device information; and
a control step of determining an internal state of the communication apparatus and controlling a connection to the external apparatus via the second communication unit in accordance with a determination result,
wherein in the control step, a determination timing is changed in accordance with a type of the external apparatus determined based on the device information obtained via the first communication unit, the determination timing is a timing at which the control unit determines the internal state of the communication apparatus,
wherein the determination timing when the type of the external apparatus is not a handheld device is earlier than the determination timing when the type of the external apparatus is a handheld device.

19. A control method of a communication apparatus connectable to an external apparatus via first communication unit and second communication unit different from the first communication unit, the method comprising:
an obtaining step of obtaining device information about the external apparatus from the external apparatus via the first communication unit; and
a control step of controlling connection processing to the external apparatus via the second communication unit based on the device information,
wherein in the control step, an internal state of the communication apparatus is determined, and
wherein in the control step, a determination level of the internal state of the communication apparatus is changed in accordance with a type of the external apparatus from which the device information has been obtained via the first communication unit,
wherein a determination criterion used in determination of the internal state of the communication apparatus executed when the type of the external apparatus is not a handheld device is stricter than that used in determination of the internal state of the communication apparatus executed when the type of the external apparatus is a handheld device.

20. A non-transitory computer-readable storage medium storing a program that when executed causes a computer to perform a control method of a communication apparatus connectable to an external apparatus via first communication unit and second communication unit different from the first communication unit, the method comprising:
an obtaining step of obtaining device information about the external apparatus from the external apparatus via the first communication unit;
a connection step of performing connection processing to the external apparatus via the second communication unit based on the device information; and
a control step of determining an internal state of the communication apparatus and controlling a connection to the external apparatus via the second communication unit in accordance with a determination result,
wherein in the control step, a determination timing is changed in accordance with a type of the external apparatus determined based on the device information obtained via the first communication unit, the determination timing is a timing at which the control unit determines the internal state of the communication apparatus,
wherein the determination timing when the type of the external apparatus is not a handheld device is earlier than the determination timing when the type of the external apparatus is a handheld device.

21. A non-transitory computer-readable storage medium storing a program that when executed causes a computer to perform a control method of a communication apparatus connectable to an external apparatus via first communication unit and second communication unit different from the first communication unit, the method comprising:

an obtaining step of obtaining device information about the external apparatus from the external apparatus via the first communication unit; and a control step of controlling connection processing to the external apparatus via the second communication unit based on the device information, wherein in the control step, an internal state of the communication apparatus is determined, and wherein in the control step, a determination level of the internal state of the communication apparatus is changed in accordance with a type of the external apparatus from which the device information has been obtained via the first communication unit, wherein a determination criterion used in determination of the internal state of the communication apparatus executed when the type of the external apparatus is not a handheld device is stricter than that used in determination of the internal state of the communication apparatus executed when the type of the external apparatus is a handheld device.

* * * * *